(12) United States Patent
O'Brien et al.

(10) Patent No.: US 7,793,999 B2
(45) Date of Patent: Sep. 14, 2010

(54) HANDLE

(75) Inventors: Timothy F. O'Brien, White Lake, MI (US); Larry Vigneau, Ortonville, MI (US); Daniel V. Beckley, Byron, MI (US); James E. Thorburn, Holly, MI (US)

(73) Assignee: Magna International Inc., Aurora (CA)

( * ) Notice: Subject to any disclaimer, the term of this patent is extended or adjusted under 35 U.S.C. 154(b) by 206 days.

(21) Appl. No.: 12/040,414

(22) Filed: Feb. 29, 2008

(65) Prior Publication Data

US 2009/0218838 A1 Sep. 3, 2009

(51) Int. Cl.
*B62D 39/00* (2006.01)

(52) U.S. Cl. ...................................................... 296/1.02

(58) Field of Classification Search ................. 296/1.02; 16/110.1, 412, DIG. 40, DIG. 41

See application file for complete search history.

(56) References Cited

U.S. PATENT DOCUMENTS

2007/0267884 A1* 11/2007 Failla et al. ................. 296/1.02

* cited by examiner

*Primary Examiner*—Lori L Lyjak
(74) *Attorney, Agent, or Firm*—Honigman Miller Schwartz and Cohn LLP

(57) ABSTRACT

An interior trim component includes a handle having a cradle portion and an insert portion, the insert portion is nested within a cavity of the cradle portion, the first ends of the cradle and insert portions define a tucking portion and the second ends define a latching portion.

18 Claims, 7 Drawing Sheets

HANDLE

TECHNICAL FIELD

The invention relates in general to a handle and a method for assembling the same.

BACKGROUND

In the automotive interior industry, for example, it is known that handles may be associated with interior trim components. Conventional interior trim component handles are typically molded into a desired shape with a material including, for example, an oil-based, synthetic resin.

During the molding of a conventional handle, a significant amount of wasted material may be blown through and out of a mold cavity. Due to recent increases in global demand for oil, businesses are more inclined recycle oil-based materials that are wasted in a molding operation. Accordingly, additional time and energy is usually spent in a recycling process by subsequently (a) grinding the wasted material into smaller particles and then (b) melting the ground particles for subsequent injection into the mold cavity in a subsequent molding operation.

Further, in the design of conventional handles, denser/heavier materials may be selected to ensure that the denser/heavier material is completely blown through and fills the mold cavity during the molding operation. However, such denser/heavier materials may undesirably decrease fuel efficiency of a vehicle due to the fact that the handle may increase the overall weight of the vehicle.

In view of the above drawbacks and for other reasons, a need exists in the art for an improved handle as well as an improved efficiency over conventional methodologies for manufacturing the handle in order to eliminate or reduce waste material and/or the recycling process.

BRIEF DESCRIPTION OF THE DRAWINGS

The disclosure will now be described, by way of example, with reference to the accompanying drawings, in which.

DETAILED DESCRIPTION

The Figures illustrate an exemplary embodiment of a handle and a method for assembling the same in accordance with an embodiment of the invention. Based on the foregoing, it is to be generally understood that the nomenclature used herein is simply for convenience and the terms used to describe the invention should be given the broadest meaning by one of ordinary skill in the art.

Referring to FIGS. 1-5, a handle is shown generally at 10. The handle 10 may be grasped by a user's hand.

Figure 6:
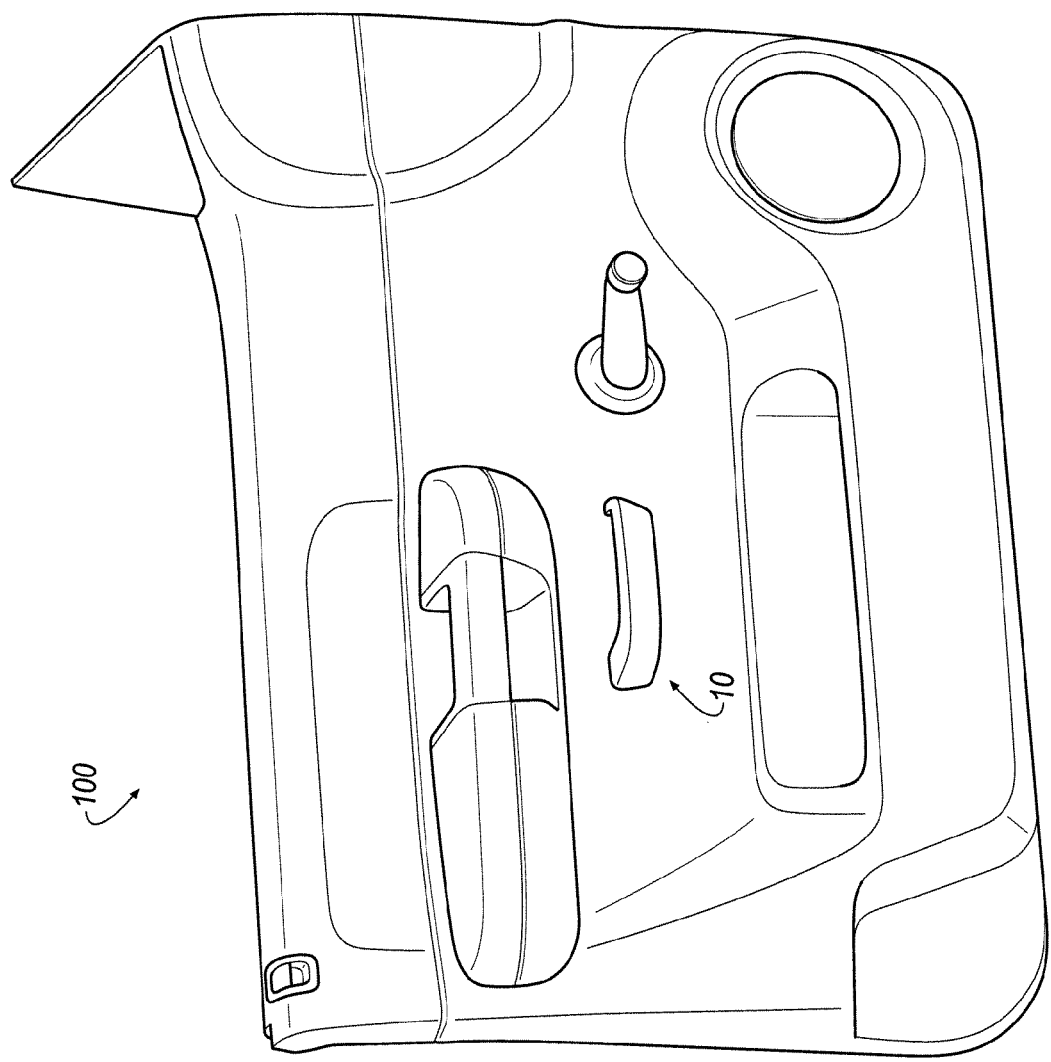
FIG. 6 is a perspective view of the handle of FIGS. 2C and 5 attached to an interior trim door panel in accordance with an exemplary embodiment of the invention.

In an embodiment, the handle 10 may be associated with a door 100 (see, e.g. FIG. 6). In an embodiment, the door 100 may comprise, for example, an interior trim panel and sheet metal that is attached to a vehicle (not shown). The handle 10 may permit a user to move the door 100 between open and closed positions relative the vehicle.

In another embodiment, the handle 10 may be a "grab handle." Grab handles are typically mounted to a spatially fixed vehicular interior trim surface (e.g. a headliner, pillar or the like) and may be located in a substantially "over-the-head" position relative a seated/standing location of the user located in the passenger compartment area of a vehicle. Further, grab handles may function by at least partially bearing the weight of the user located within the vehicle, or, alternatively, a user that is entering/exiting the vehicle.

Although it is mentioned in the foregoing disclosure that the handle 10 may be incorporated within a vehicle as a vehicular interior trim component, it will be appreciated that the handle 10 is not limited to vehicular interior trim applications. For example, the handle 10 may be included with any desirable device, such as, for example, a door connected to a refrigerator.

Figure 1:
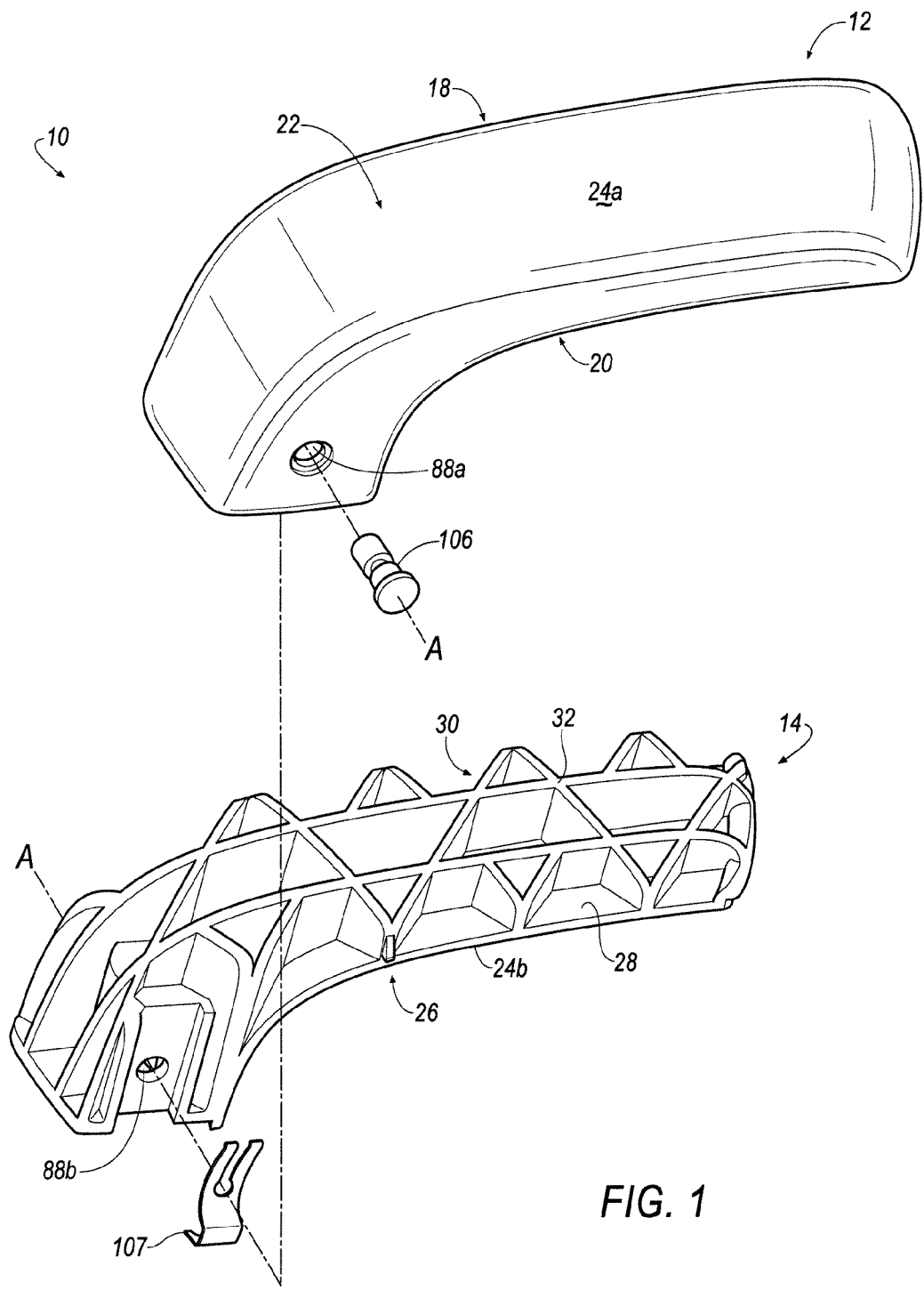
FIG. 1 is an exploded, perspective view of a handle including a cradle portion and an insert portion in accordance with an exemplary embodiment of the invention.
Figure 2A:
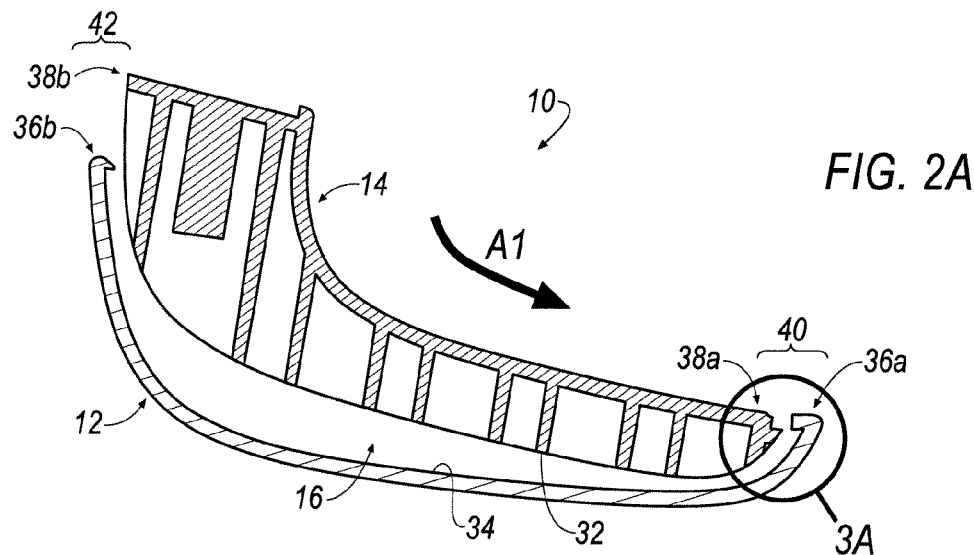
FIG. 2A illustrates a cross-sectional side view of the cradle portion and the insert portion defining the handle of FIG. 1 in a first assembling step in accordance with an exemplary embodiment of the invention.
Figure 2B:
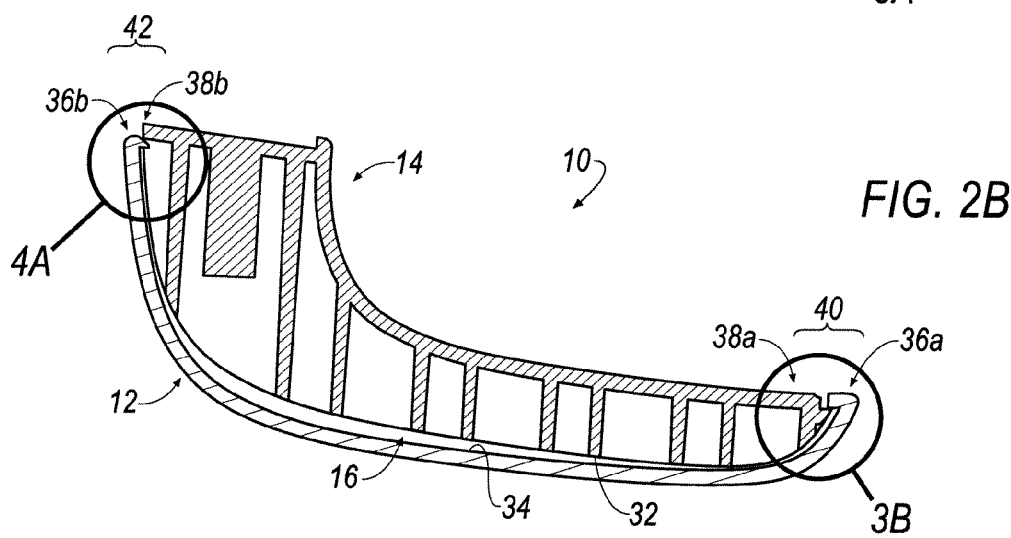
FIG. 2B illustrates a cross-sectional side view of the cradle portion and the insert portion defining the handle of FIG. 1 in another assembling step in accordance with an exemplary embodiment of the invention.
Figure 2C:
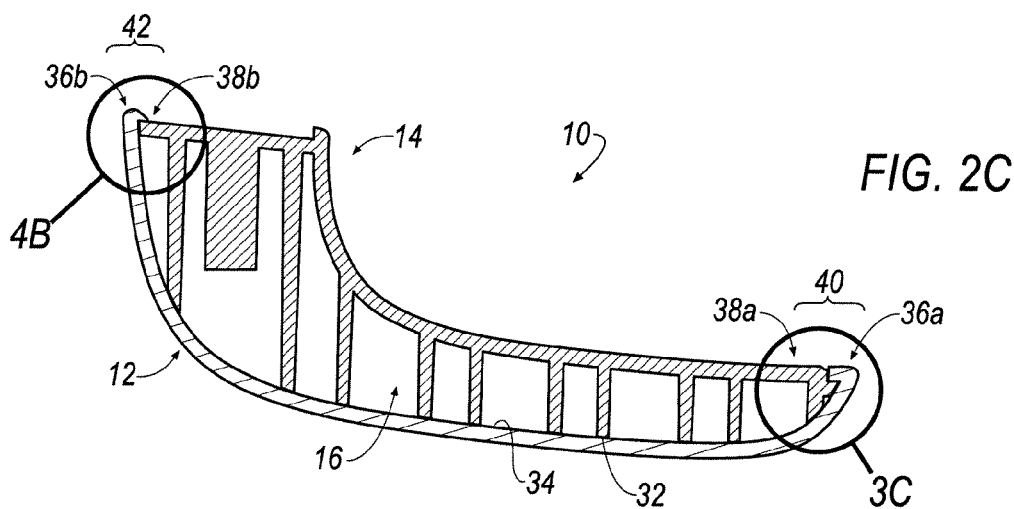
FIG. 2C illustrates a cross-sectional side view of an assembled handle defined by the cradle portion and the insert portion of FIG. 1 in accordance with an exemplary embodiment of the invention.

Referring now to FIGS. 1-2C, the handle 10 is shown to include two components. As illustrated, the handle 10 includes a first portion, which is shown generally at 12 and a second portion, which is shown generally at 14.

The first portion 12 is hereinafter referred to as a cradle portion. The second portion 14 is hereinafter referred to as an insert portion. As seen in FIG. 2C, the insert portion 14 is ultimately nested into and secured within a cavity 16 (see, e.g., FIGS. 2A and 3A-4B) of the cradle portion 12 to define the handle 10.

Referring to FIG. 1, the cradle portion 12 includes a top portion 18, a bottom portion 20, and a side portion 22 that is located between the top portion 18 and the bottom portion 20. Collectively, the portions 18-22 define a cradle A-surface 24a that may be seen by and may grasped by a user's hand.

Still referring to FIG. 1, the insert portion 14 includes a side portion, which is shown generally at 26. The side portion 26 defines the insert A-surface 24b that may be seen by and grasped by a user's hand.

Further, the side portion 26 may also define an insert B-surface, which is shown generally at 28. When the handle 10 is assembled (i.e., when the insert portion 14 is nested within the cavity 16 of the cradle portion 12), the insert B-surface 28 is neither seen by nor accessible to a user's hand.

Extending from the B-surface 28 is a plurality of ribs 30 that increases the strength of the handle 10. In an embodiment, the ribs 30 may include a surface 32 that, may, in an embodiment, be contoured in order to permit direct contact of a portion of the insert B-surface 28 with a cavity surface 34 (see, e.g., FIGS. 2A-4B) defined by the cavity 16. In an embodiment, the cavity surface 34 defines a B-surface of the cradle portion 12 that is not seen by a user or accessible to a user's hand when the insert portion 14 is nested in the cradle portion 12.

As seen in FIGS. 2A-2C, the cradle portion 12 is generally defined to include a first end, which is shown generally at 36a, and a second end, which is shown generally at 36b. Similarly, the insert portion 14 is generally defined to include a first end, which is shown generally at 38a, and a second end, which is shown generally at 38b.

Figure 3A:
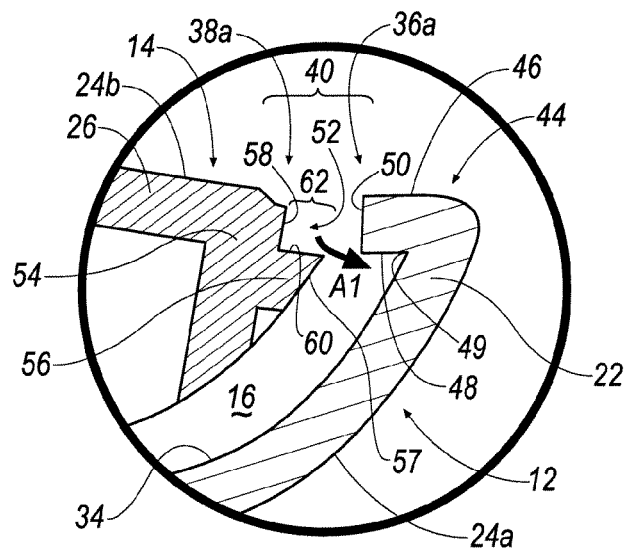
FIG. 3A illustrates an enlarged cross-sectional view of the cradle portion and the insert portion according to line 3A of FIG. 2A in accordance with an exemplary embodiment of the invention.
Figure 3B:
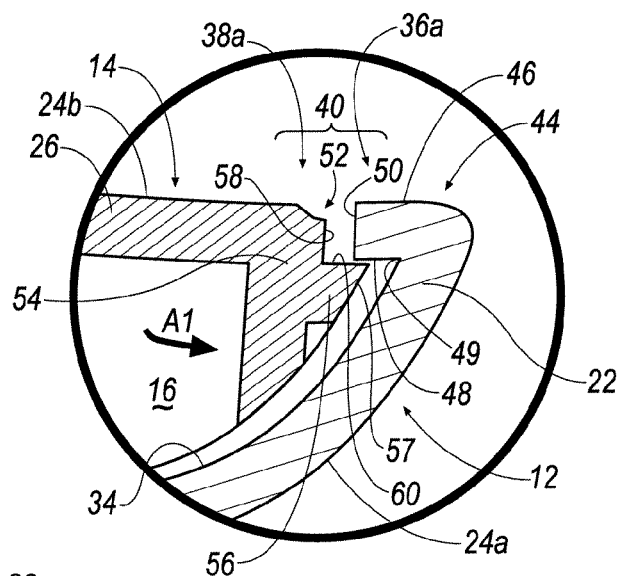
FIG. 3B illustrates an enlarged cross-sectional view of the cradle portion and the insert portion according to line 3B of FIG. 2B in accordance with an exemplary embodiment of the invention.
Figure 3C:
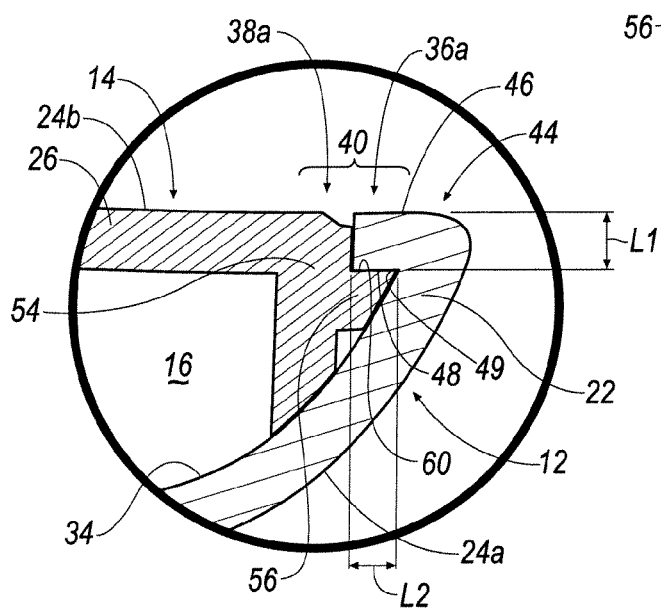
FIG. 3C illustrates an enlarged cross-sectional view of the cradle portion and the insert portion according to line 3C of FIGS. 2C and 5 in accordance with an exemplary embodiment of the invention.

The first ends 36a, 38a of the cradle portion 12 and the insert portion 14 generally define a tucking portion 40, which is explained in greater detail in FIGS. 3A-3C. The second ends 36b, 38b of the cradle portion 12 and the insert portion 14 generally define a latching portion 42, which is explained in greater detail in FIGS. 4A-4B.

Referring now to FIGS. 3A-3C, the tucking portion 40 is described. As illustrated, the first end 36a of the cradle portion 12 generally includes a cantilevered portion 44 that extends substantially perpendicularly from the side portion 22.

The cantilevered portion 44 defines an outer cantilever surface 46 and an inner cantilever surface 48. Further, the cantilevered portion 44 may include a side cantilever surface 50 extending between the outer and inner cantilever surfaces 46, 48.

As illustrated, the outer cantilever surface 46 defines a portion of the cradle A-surface 24a. In an embodiment, the inner cantilever surface 48 may be continuous with the cavity surface 34 such that the inner cantilever surface 48 defines a portion of the B-surface of the cradle portion 12. However, it will be appreciated that the inner cantilever surface 48 may not be continuous with the cavity surface 34; for example, in an embodiment, the inner cantilever surface 48 may be demarcated from the cavity surface 34 at an interior point or corner, which is shown generally at 49, that interrupts the curvature of the cavity surface 34.

In an embodiment, the side cantilever surface 50 is substantially perpendicular to the outer and inner cantilever surfaces 46, 48. However, it will be appreciated that the side cantilever surface 50 may be non-perpendicular to the outer and inner cantilever surfaces 46, 48.

As illustrated, the first end 38a of the insert portion 14 includes a stepped portion 52 that includes a first leg 54 and a second leg 56. The first leg 54 extends substantially perpendicularly from the side portion 26. The second leg 56 extends substantially perpendicularly from the first leg 54. Although the first and second legs 54, 56 are described to extend substantially perpendicularly, it will be appreciated that the first and second legs 54, 56 may extend non-perpendicularly as well.

In general, the first leg 54 is defined by a first surface 58 having a length, L1 (see, e.g., FIG. 3C), and the second leg 56 is defined by a second surface 60 having a length, L2 (see, e.g., FIG. 3C). In an embodiment, the side cantilever surface 50 may include a length that is approximately equal to the length, L1, of the first surface 58 defined by the first leg 54. Further, in an embodiment, the inner cantilever surface 48 may include a length that is approximately equal to the length, L2, of the second surface 60 defining the second leg 56. Due to the similarity of the lengths, L1, L2, of the surfaces of the stepped portion 52 and the cantilever portion 44, the tucking portion 40 is further defined to functionally permit the first ends 36a, 38a of the handle 10 to interlock with one another upon latching of the latching portion 42 as described in the foregoing disclosure.

Referring to FIG. 3A, the first and second surfaces 58, 60 define a first portion/length 62 of the insert A-surface 24b. However, as seen in FIG. 3C, the first portion 62 of the insert A-surface 24b is not viewable or accessible by a user's hand once the insert 14 is nested within the cradle 12.

Figure 4A:
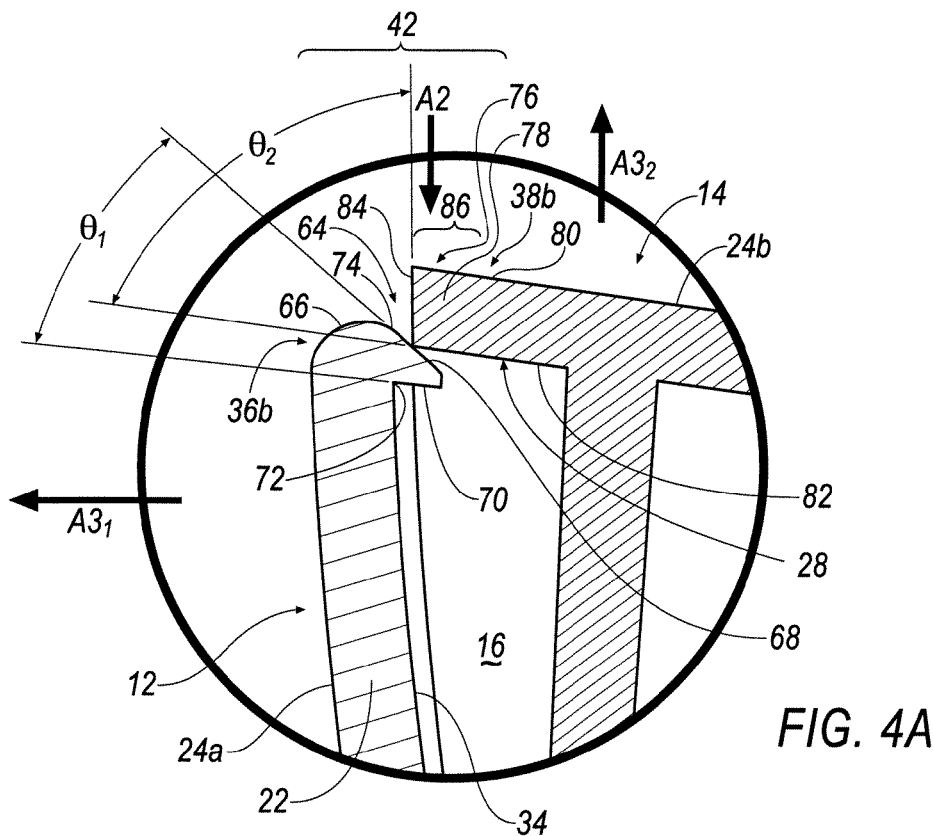
FIG. 4A illustrates an enlarged cross-sectional view of the cradle portion and the insert portion according to line 4A of FIG. 2B in accordance with an exemplary embodiment of the invention.
Figure 4B:
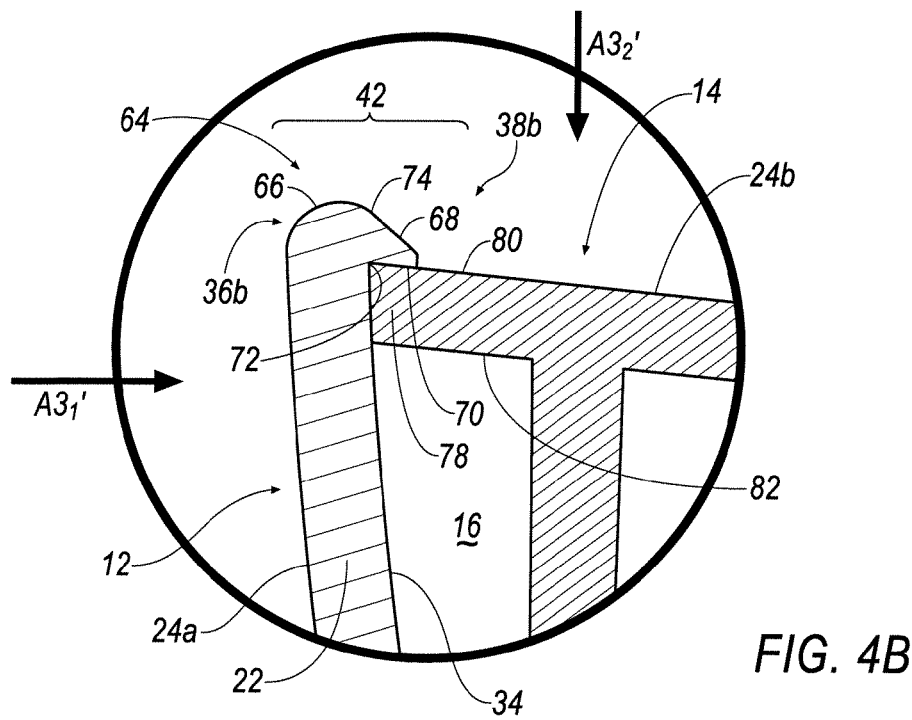
FIG. 4B illustrates an enlarged cross-sectional view of the cradle portion and the insert portion according to line 4B of FIGS. 2C and 5 in accordance with an exemplary embodiment of the invention.

Referring now to FIGS. 4A-4B, the latching portion 42 is described. As illustrated, the second end 36b of the cradle portion 12 generally includes a ramped portion 64 that extends substantially perpendicularly from the side portion 22.

The ramped portion 64 defines an outer, arcuate head surface 66, a nose surface 68 and a substantially flat, inner surface 70. As illustrated, the nose surface 68 extends between the outer, arcuate head surface 66 and the inner, flat surface 70.

As illustrated, the outer, arcuate head surface 66 and the nose surface 68 define a portion of the cradle A-surface 24a. In an embodiment, the inner, flat surface 70 may define a portion of the B-surface of the cradle portion 12. In an embodiment, the inner, flat surface 70 may be continuous with the cavity surface 34. However, it will be appreciated that the inner, flat surface 70 may not be continuous with the cavity surface 34; for example, in an embodiment, the inner, flat surface 70 may be demarcated from the cavity surface 34 at an interior point or corner, which is shown generally at 72, that interrupts the curvature of the cavity surface 34.

In an embodiment, the inner, flat surface 70 is arranged to be substantially perpendicular to the cavity surface 34. The nose surface 68 extends from the inner, flat surface 70 at an angle, $\theta_1$ (see, e.g., FIG. 4A) approximately equal to, for example, 35°. In an embodiment, the arcuate head surface 66 extends from the nose surface 68 without interruption from a point, which is shown generally at 74.

As illustrated, the second end 38b of the insert portion 14 includes a wedgable portion 76 defined by a lip 78 of the side portion 26. In general, the lip 78 is defined by a first, outer surface 80, a second, inner surface 82 and a third, side surface 84 extending between the first and second surfaces 80, 82. As referenced from the second, inner surface 82, the third, side surface 84 extends at an angle, $\theta_2$ (see, e.g., FIG. 4A), approximately equal to, for example, 60°.

A second portion/length of the insert A-surface 24b is shown generally at 86. Similarly, as described above regarding the first portion 62 of the insert A-surface 24b, the second portion 86 of the insert A-surface 24b is also not viewable or accessible by a user's hand once the insert 14 is nested within the cradle 12 (see, e.g., FIG. 4B).

Figure 5:
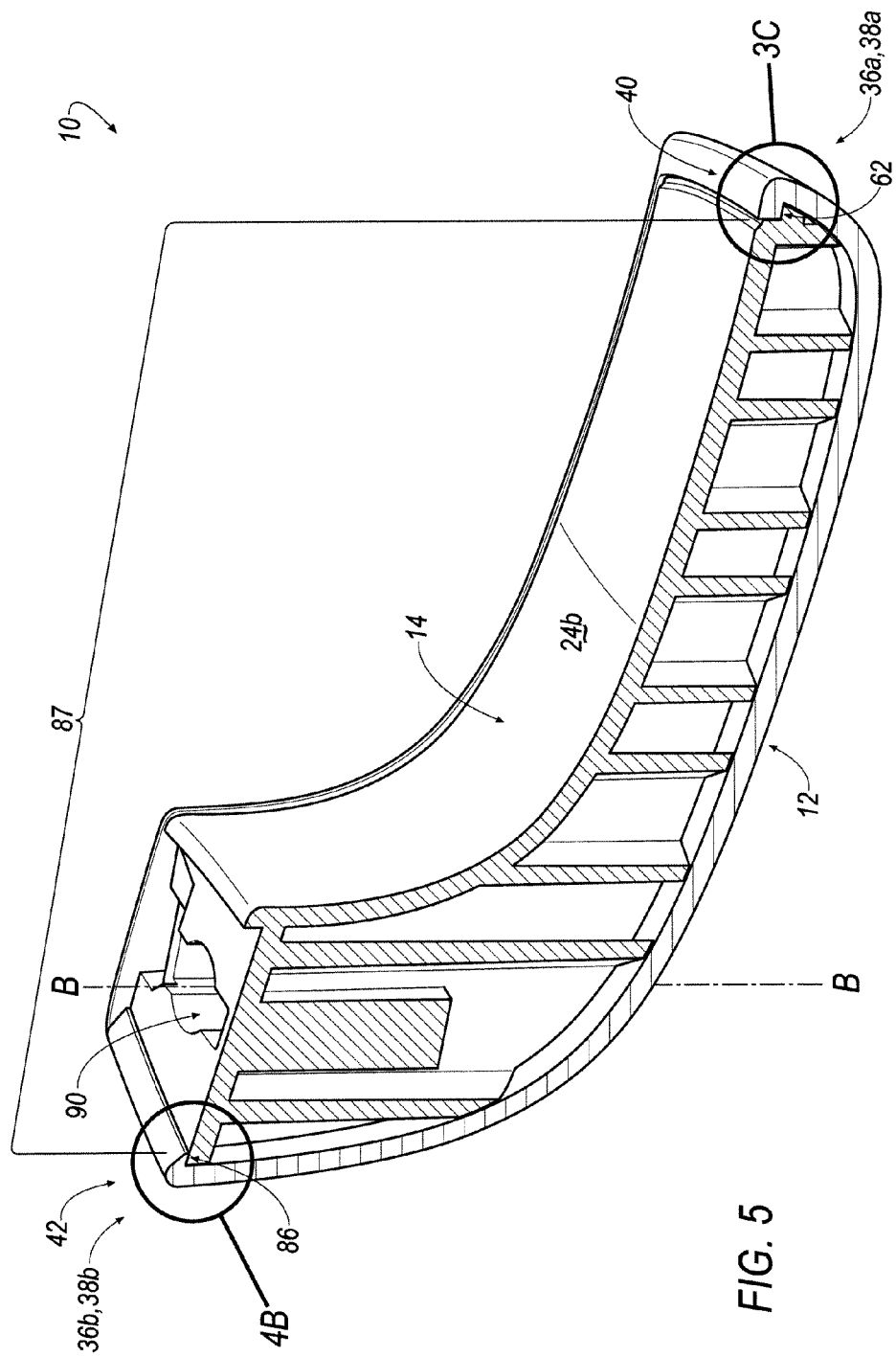
FIG. 5 illustrates a perspective, cross-sectional view of the handle of FIG. 2C in accordance with an exemplary embodiment of the invention.

Further, the insert A-surface 24b may include a third portion/length, which is shown generally at 87 in FIG. 5, that extends between the first and second portions 62, 86 of the insert A-surface 24b. As illustrated, the third portion/length 87 of the insert A-surface 24b includes a substantial length or amount of the insert A-surface 24b. In an embodiment, the third portion/length 87 of the insert A-surface 24b may include more than 99% of the length of the insert A-surface 24b. However, it will be appreciated that the third portion/length 87 of the insert A-surface 24b is not limited to a substantial length or amount of the insert A-surface 24b and that the third portion/length 87 of the insert A-surface 24b may include a length that is equal to or less than the combination of the first and second portions 62, 86 of the insert A-surface 24b.

Referring now to FIGS. 2A-2C, a method for manufacturing the handle 10 is described. First, prior to nesting the insert portion 14 within the cradle portion 12, each of the cradle portion 12 and the insert portion 14 are formed, for example, in a molding operation. The material comprising the cradle portion 12 and the insert portion 14 may be any desirable material having any desirable light- or heavy-weight characteristic including, for example, an engineered thermoplastic, thermoset plastic, glass-filled nylon, or the like.

Further, it will be appreciated that the cradle portion 12 and the insert portion 14 may comprise the same material, or, alternatively, a different material. For example, the insert portion 14 may comprise a relatively hard and rigid material whereas the cradle portion 12 may comprise a relatively soft, aesthetically pleasing material that is substantially similar to touch and feel as that of artificial leather. In another embodiment, the handle portion 12 may include a different, softer material due to the fact that the A-surface 24a of the cradle portion 12 comprises a substantial amount of the viewable/accessible, A- or show surface of the handle 10 that is composed, collectively, of the A-surface 24a of the cradle portion 12 and the A-surface 24b of the insert portion 14.

Once the cradle portion 12 and insert portion 14 are formed, a process for nesting the insert portion 14 within the cradle portion 12 to assemble the handle 10 is initiated. Firstly, in an embodiment, as seen in FIGS. 2A and 3A, the first end 38a of the insert portion 14 (e.g., the first portion 62 of the A-surface 24b of the insert portion 14) is disposed proximate the first end 36a of the cradle portion 12 (e.g., a portion of the B-surface of the cradle portion 12) in the direction according to arrow, A1. Then, as seen in FIGS. 2B and 3B, one of or both the first and second surfaces 58, 60 of the first and second legs 54, 56 of the insert portion 14 is/are partially tucked against one of or both the inner and side cantilever surfaces 48, 50 of the cantilevered portion 44 of the cradle portion 12.

Referring to FIG. 4A, once the first end 38a of the insert portion 14 is partially tucked against the first end 36a of the cradle portion 12 as described above in FIG. 3B, the second end 38b of the insert portion 14, such as, for example, a portion of the B-surface 28 of the insert portion 14, is placed against the second end 36b of the cradle portion 12, such as, for example, a portion of the A-surface 24a of the cradle portion 12. For example, in an embodiment, the second, inner surface 82 of the second end 38b of the insert portion 14 is placed adjacent one or both of the outer, arcuate head surface 66 and the nose surface 68 of the second end 36b of the cradle portion 12.

Once the second end 38b of the insert portion 14 is placed adjacent the second end 36b of the cradle portion 12 as described above, a force generally in the direction of arrow, A2, is applied to the second end 38b of the insert portion 14 so as to urge the second end 38b of the insert portion 14 to slide against the nose surface 68 as the first end 38a of the insert portion 14 is leveraged/partially tucked against the first end 36a of the cradle portion 12. For example, in an embodiment, the third, one or more of the inner and side surfaces 82, 84 of the second end 38b of the insert portion 14 may push and slides against the nose surface 68 of the second end 36b of the cradle portion 12.

As one or more of the surfaces 82, 84 pushes/slides against the nose surface 68, one of or both of the second ends 36b, 38b of the cradle and insert portions 12, 14 may flex outwardly in the direction of arrows, $A3_1$, $A3_2$ (see, e.g., FIG. 4A) Then, once the third, side surface 84 of the second end 38b of the insert portion 14 has slid past and cleared the nose surface 68, one of or both of the second ends 36b, 38b of the cradle and insert portions 12, 14 may flex inwardly in the direction of arrows, $A3_1'$, $A3_2'$ (see, e.g., FIG. 4B), which is opposite the direction of arrows, $A3_1$, $A3_2$.

Upon one of or both of the second ends 36b, 38b of the cradle and insert portions 12, 14 flexing inwardly in the direction of arrows, $A3_1'$, $A3_2'$, the second end 38b of the insert portion 14 may be said to have been latched or snapped into place within the second end 36b of the cradle 12 due to a "snapping sound" that is made by the interaction of the cradle portion 12 and insert portion 14 at the second ends 36b, 38b. As seen in FIG. 4B, when latched/snapped into place, the first, outer surface 80 and the third, side surface 84 of the lip 78 become wedged against the inner, flat surface 70 and the cavity surface 34, respectively, as the first leg 54 and second 56 of the stepped portion 52 become interlocked with and fully tucked against the side cantilever surface 50 and the inner cantilever surface 48, respectively. Accordingly, each of the first and second portions 62, 86 of the A-surface 24b of the insert portion 14 is located adjacent a portion of the B-surface of the cradle portion 12 defined, respectively by the inner and side cantilever surfaces 48, 50 and the inner, flat surface 70.

As seen in FIG. 5, an assembled, cross-sectional view of the handle 10 is shown according to an embodiment. It will be appreciated that the latching portion 42 of the handle 10 is defined by two portions (i.e., the second ends 36b, 38b of the cradle portion 12 and the insert portion 14) that are latched and disposed adjacent one another. Further, it will be appreciated that the tucking portion 40 is also defined by two portions (i.e., the first ends 36a, 38a of the cradle portion 12 and the insert portion 14) that are mechanically interlocked and tucked adjacent one another; however, as indicated above in the assembly process, it is seen that the tucking portion 40 is partially tucked in an unlocked/unlatched, loose fashion (see, e.g., FIG. 3B) until the latching portion 42 is latched (see, e.g., FIG. 4B). As such, it will be appreciated that both the tucking portion 40 and the latching portion 42 permit the two-piece handle 10 to be interlocked and tucked at a first end 36a, 38a and latched at a second end 36b, 38b. Further, it will be appreciated that the interlocked/tucked aspect of the tucking portion 40 is achieved responsive to the mechanical latching of the latching portion 42.

In view of the above description, however, it will be appreciated that a particular structural configuration of the tucking portion 40 and the latching portion 42 is not limited to that as shown and described in FIGS. 1-5. For example, in an alternative embodiment, the first end 36a, 38a of the handle 10 may include a substantially similar structure as that associated with the latching portion 42. Accordingly, a handle 10 including a latching portion 42 at each of the first end 36a, 38b and the second end 36b, 38b may be assembled in a substantially similar manner as described above by loosely tucking a first end 38a of an insert portion 14 at a first end 36a of the cradle portion 12 (both defining, in this embodiment, a latching portion structure 42) and then subsequently interlocking/tucking the first end 38a of the insert portion 14 at the first end 36a of the cradle portion 12 upon latching the second end 36b, 38b of the handle 10 defining a latching portion 42. Accordingly, if it is desired to service the handle 10 by removing the insert portion 14 from the handle portion, the provision of a latching portion 42 at each of the first and second ends of the handle 10 may permit a user to outwardly flex one of or both of the ends of the handle 10 to remove the insert portion 14 from the cradle portion 12.

Referring back to the illustrated embodiment of FIGS. 1-5, upon latching the second end 38b of the insert portion 14 with the second end 36b of the cradle portion 12, it will be appreciated that the latching portion 42 elastically resumes its former, at-rest shape, prior to nesting the insert portion 14 in the cavity 16. Accordingly, the elasticity of the second end 36b of the cradle portion 12 imparts a force generally in the direction of the arrow, $A3_1'$, so as to retain the insert portion 14 within the cavity 16 of the cradle portion 12.

In an embodiment, the force imparted by the second end 36b of the cradle portion 12 in the direction of the arrow, $A3_1'$, against the second end 38b of the insert portion 12 generally results in (a) the cavity surface 34 of the cradle portion 12 being forced adjacent the third, side surface 84 of the second end 38b of the insert portion 14, (b) the first surface 58 of the first leg 54 of the first end 38a of the insert portion 14 being forced adjacent the side cantilever surface 50 of the cantilever portion 44 of the first end 36a of the cradle portion 12, and (c) a third surface 57 of the second leg 56 being forced adjacent the cavity surface 34 of the cradle portion 12.

After assembly of the handle 10, if a force generally in the direction of the arrow, $A3_2$, is imparted to the handle 10 such that the force is generally exerted upon the insert portion 14, the cradle portion 12 prevents the insert portion 14 from projecting from the mechanically nested position within the cavity 16. For example, upon experiencing the force the first portion 62 and the second portion 86 of the A-surface 24b of the insert portion 14 is forced adjacent a first portion and a second portion of the B-surface of the cradle portion 12; in an embodiment, the first and second portions of the B-surface of the cradle portion 12 may be defined by the inner cantilever surface 48 and the inner flat surface 70.

Further, it will be appreciated that the first and second portions 62, 86 of the A-surface 24b of the insert portion 14 each comprises less than 1% of the length/amount of the A-surface 24b of the insert portion. Accordingly, approximately 99% or more of the length/amount of the A-surface 24b of the insert portion 14 remains exposed when the insert portion 14 is nested within the cavity 16 of the cradle portion 12.

Further, because of the nesting of the insert portion 14 within the cradle portion 12, it will be appreciated that the handle 10 is mechanically interlocked without the use of adhesive, fasteners, or the like. Further, it will be appreciated that the handle 10 is not intended to be serviceable by removing the insert portion 14 from the cradle portion 12; however, in an embodiment, if desired, at least the second end 36b of the cradle portion 12 may be flexed in the direction of arrow, $A3_1$, to permit the insert portion 14 to be removed from its latched, nested position within the cradle portion 12.

Once the handle 10 is assembled as described above, the handle 10 may be attached to an interior trim component such as, for example, an interior trim door panel 100 (see, e.g., FIG. 6) of a vehicle (not shown). Referring to FIG. 1, the cradle portion 12 and the insert portion 14 may each include passages, which are shown generally at 88a, 88b. When the insert portion 14 is secured to the cradle portion 12 as described above, the passages 88a, 88b may be axially aligned such that a first axis, A-A, may extend therethrough. Further, as seen in FIG. 5, the insert portion 14 may define a second passage 90.

As illustrated, a second axis, B-B, may extend through the second passage 90 and may be substantially perpendicular to the first axis, A-A.

Figure 7:
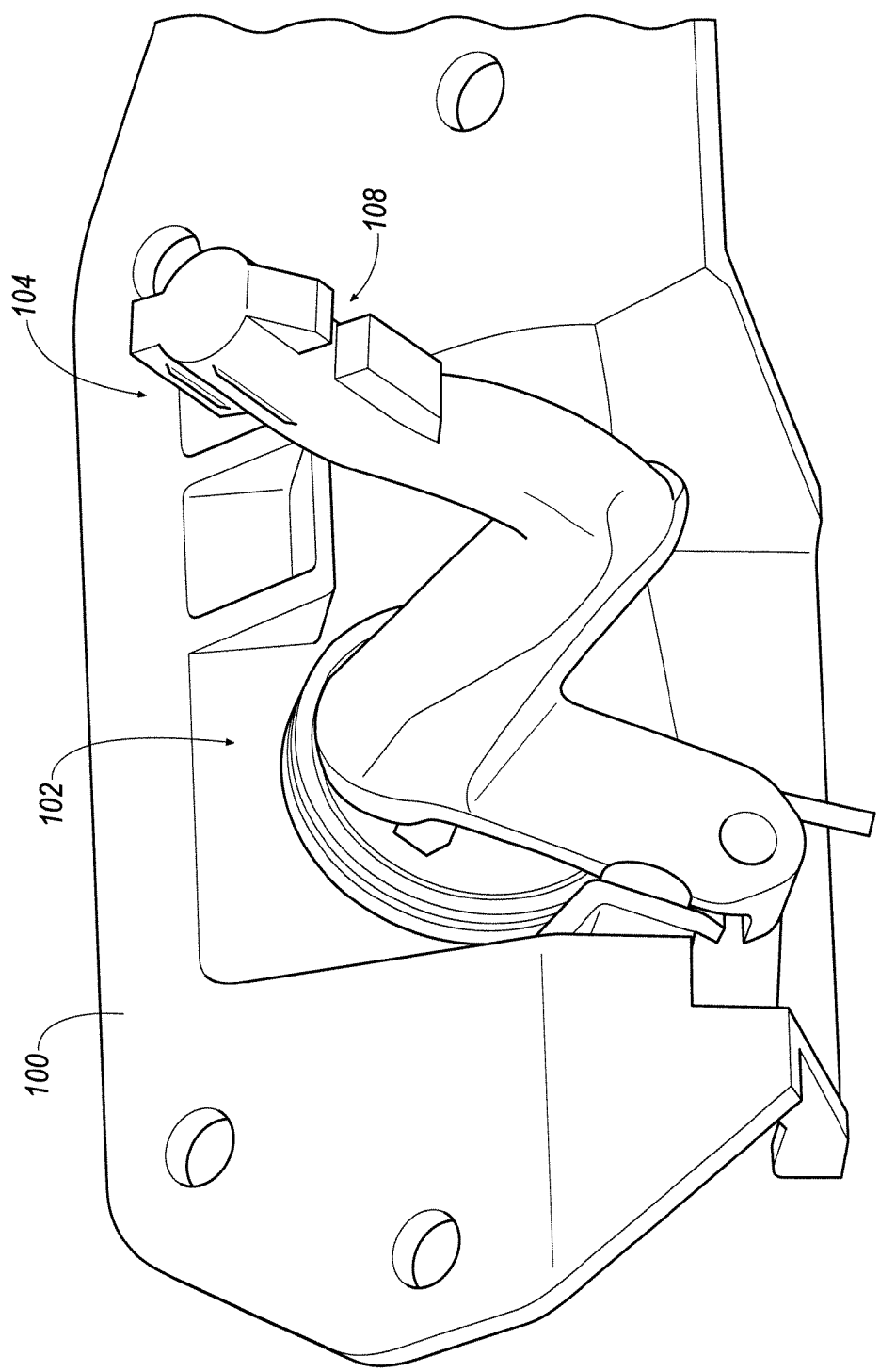
FIG. 7 is a perspective view of a bell crank of the interior trim door panel that is utilized to attach the handle of FIGS. 2C and 5 to the door panel of FIG. 6 in accordance with an exemplary embodiment of the invention.

Referring to FIG. 7, the handle 10 may be subsequently attached to a bell crank 102 that is pivotably attached to the door panel 100. The bell crank 102 is described in greater detail in commonly-owned application Ser. No. 11/189,282 filed on Jul. 26, 2005, the contents of which are herein incorporated by reference.

In an embodiment, the handle 10 may be attached to the bell crank 102 by inserting a free end 104 of the bell crank 102 through the second opening 90 formed in the insert portion 14. Once the handle 10 is attached to the free end 104 of the bell crank 102, a pin 106 (see, e.g., FIG. 1) is inserted through the first passage 88a of the cradle portion 12, a passage of a spring clip 107, the passage 88b of the insert portion 14 and a notch 108 of the free end 104 of the bell crank 102. Once the pin 106 is inserted as described above, the handle 10 may be operably-attached to the door panel 100 by way of the bell crank 102.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An interior trim component, comprising:
   a handle including
      a cradle portion including a cavity, and
      an insert portion nested within the cavity of the cradle portion, wherein each of the insert portion and cradle portion includes
         a first end, and
         a second end, wherein the first ends of the cradle and insert portions define
            a tucking portion, and, wherein the second ends of the cradle and insert portions define
            a latching portion.

2. The interior trim component according to claim 1, wherein each of the cradle and insert portions define
   an A-surface, and
   a B-surface, wherein the A-surface of the insert portion defines
      a first A-surface portion, and
      a second A-surface portion, wherein the B-surface of the cradle portion defines
      a first B-surface portion, and
      a second B-surface portion, wherein the first A-surface portion of the insert portion is adjacent the first B-surface portion of the cradle portion, wherein the second A-surface portion of the insert portion is adjacent the second B-surface portion of the cradle portion.

3. The interior trim component according to claim 2, wherein the A-surface of the insert portion includes a third A-surface portion between the first A-surface portion and the second A-surface portion, wherein the third A-surface portion is not adjacent the B-surface of the cradle portion.

4. The interior trim component according to claim 3, wherein the A-surface of the insert portion is defined by a length, wherein the first A-surface portion includes approximately less than 1% of the length of the A-surface of the insert portion, wherein the second A-surface portion includes approximately less than 1% of the length of the A-surface of the insert portion, wherein the third A-surface portion of the A-surface of the insert portion includes approximately 99% or more of the length of the A-surface of the insert portion.

5. The interior trim component according to claim 3, wherein the first A-surface portion of the insert portion is located at the first end of the insert portion, wherein the second A-surface portion of the insert portion is located at the second end of the insert portion, wherein the first B-surface portion of the cradle portion is located at the first end of the cradle portion, wherein the second B-surface portion of the cradle portion is located at the second end of the cradle portion.

6. The interior trim component according to claim 2, wherein the B-surface of the insert portion directly engages the B-surface of the cradle portion.

7. The interior trim component according to claim 6, wherein the B-surface of the insert portion includes structural ribs having a contact surface, wherein the B-surface of the cradle portion includes a cavity surface defining the cavity, wherein the contact surface of the structural ribs directly engages the cavity surface.

8. The interior trim component according to claim 1, wherein the first end of the cradle portion includes
 a cantilevered portion, wherein the first end of the insert portion includes
 a stepped portion nested against the cantilevered portion.

9. The interior trim component according to claim 8, wherein the cantilevered portion is defined by
 an outer cantilever surface,
 an inner cantilever surface, and
 a side cantilever surface extending between the outer and inner cantilever surfaces, wherein the stepped portion is defined by
 a first leg including a first leg surface, and
 a second leg including a second leg surface, wherein the second leg extends substantially perpendicularly from the first leg, wherein the side cantilever surface is adjacent the first leg surface, wherein the inner cantilever surface is adjacent the second leg surface.

10. The interior trim component according to claim 1, wherein the second end of the cradle portion includes
 a ramped portion, wherein the second end of the insert portion includes
 a wedgable portion nested against the ramped portion.

11. The interior trim component according to claim 10, wherein the ramped portion is defined by
 an outer, arcuate head surface,
 an inner surface, and
 a nose surface extending between the outer arcuate head surface and the inner surface, wherein the wedgable portion is defined by a lip including
 a first, outer surface,
 a second, inner surface, and
 a third, side surface extending between the first, outer surface and the second, inner surface, wherein the inner surface of the ramped portion is adjacent the first, outer surface of the wedgable portion.

12. The interior trim component according to claim 1, wherein each of the cradle and insert portions include axially-aligned pin passages, wherein the insert portion includes an attachment end passage.

13. The interior trim component according to claim 12 further comprising an interior trim panel that is attached to the handle by way of a bell crank being inserted through the attachment end passage and a pin extended through the axially-aligned passages.

14. A method for assembling an interior trim component, comprising the steps of:
 assembling a handle by
  providing a cradle portion that defines a cavity, a cradle A-surface and a cradle B-surface;
  providing an insert portion that defines an insert A-surface and an insert B-surface;
  disposing a first end of the insert portion within the cavity and proximate a first end of the cradle portion;
  partially disposing a first portion of the insert A-surface against a first portion of the cradle B-surface;
  disposing a second end of the insert portion within the cavity and proximate a second end of the cradle portion, and, responsive to the disposing the second end of the insert portion step,
   latching a second portion of the insert A-surface against a second portion of the cradle B-surface, and, responsive to the latching step,
    interlocking the first portion of the insert A-surface against the first portion of the cradle B-surface.

15. The method according to claim 14, wherein prior to the disposing the second end of the insert portion step, further comprising the steps of
 urging a portion of the B-surface of the insert portion proximate the second end of the insert portion adjacent a portion of the A-surface of the cradle portion proximate the second end of the cradle portion; and
 outwardly flexing one or more of the second end of the insert portion and the second end of the cradle portion.

16. The method according to claim 15, wherein, subsequent to the disposing the second end of the insert portion step, further comprising the steps of
 inwardly flexing one or more of the second end of the insert portion and the second end of the cradle portion; and
 wedging the second end of the insert portion against the second end of the cradle portion.

17. A method for providing an interior trim component, comprising the steps of:
 assembling a handle by
  providing a cradle portion that defines a cradle B-surface having a first cradle B-surface portion and a second B-surface portion;
  providing an insert portion that defines an insert A-surface composing a length;
  defining a first portion of the length composing the insert A-surface;
  defining a second portion of the length composing the insert A-surface;
  defining a third portion of the length composing the insert A-surface;
  tucking the first portion of the length composing the insert A-surface against the first cradle B-surface portion;
  latching the second portion of the length composing the insert A-surface against the second cradle B-surface portion;
  interlocking the first portion of the length composing the insert A-surface with the first cradle B-surface portion; and
  exposing the third portion of the length composing the insert A-surface.

18. The method according to claim 17, wherein the third portion defining the length composing the insert A-surface is greater than the combination of the first and second portions defining the length composing the insert A-surface, and further comprising the steps of defining the first portion to comprise approximately less than 1% of the length composing the insert A-surface;
defining the second portion to comprise approximately less than 1% of the length composing the insert A-surface; and
defining the third portion to comprise more than approximately 99% of the length composing the insert A-surface.

* * * * *